United States Patent [19]

Harigaya et al.

[11] Patent Number: 5,038,231

[45] Date of Patent: Aug. 6, 1991

[54] RECORDING AND REPRODUCING APPARATUS WHICH REPOSITIONS TABLE OF CONTENTS INFORMATION FROM ONE AREA TO ANOTHER ON THE MEDIUM

[75] Inventors: Isao Harigaya; Koji Takahashi, both of Kanagawa, Japan

[73] Assignee: Canon Kabushiki Kaisha, Tokyo, Japan

[21] Appl. No.: 469,292

[22] Filed: Jan. 24, 1990

[30] Foreign Application Priority Data

Jan. 24, 1989 [JP] Japan .................................. 1-013234

[51] Int. Cl.$^5$ ............................................ G11B 15/18
[52] U.S. Cl. ...................................... 360/69; 360/72.2
[58] Field of Search ........................... 360/69, 54, 72.2

[56] References Cited

U.S. PATENT DOCUMENTS

4,357,638 11/1982 Yoshimaru ......................... 360/72.2

Primary Examiner—A. J. Heinz
Attorney, Agent, or Firm—Robin, Blecker, Daley & Driscoll

[57] ABSTRACT

In a recording and reproducing apparatus which is capable of recording and reproducing table-of-contents information to be used in making a search for the contents of a record on and from a recording medium which is used for recording and reproducing main information, the table-of-contents information recorded on the recording medium is reproduced in response to loading of the apparatus with the recording medium and is stored in a memory; and the table-of-contents information thus reproduced is erased from the recording medium.

9 Claims, 6 Drawing Sheets

| MUSIC NUMBER | | | START TIME | | | STOP TIME | | |
|---|---|---|---|---|---|---|---|---|
| X100 | X10 | X1 | HOUR | MINUTE | SECOND | HOUR | MINUTE | SECOND |
| 0 | 0 | 1 | | 3 | 5 | | 2 | 57 |
| 0 | 0 | 2 | | 5 | 4 | | 5 | 29 |
| 0 | 0 | 3 | | | 34 | | 8 | 01 |
| 7 | 9 | 9 | | | | | | |

12bit / 24bit / 24bit

RECORDING AND REPRODUCING APPARATUS WHICH REPOSITIONS TABLE OF CONTENTS INFORMATION FROM ONE AREA TO ANOTHER ON THE MEDIUM

BACKGROUND OF THE INVENTION

1. Field of the Invention

This invention relates to a recording and reproducing apparatus, and more particularly to an apparatus which is arranged to record table-of-contents information to be used in making a search for the contents of a record on a recording medium which is used for recording and reproducing main information.

2. Description of the Related Art

Some of known recording and reproducing apparatuses, such as a digital audio tape recorder (hereinafter referred to as DAT) have been arranged to write information about a table of contents of a record such as music numbers in the leader part of a magnetic tape which is employed as a recording medium and the table-of-contents information is used in making a search for the contents of a record. In the case of a video tape recorder (hereinafter referred to as VTR), information about a table of contents which are video programs is arranged to be recorded and reproduced for the same purpose.

Figure 1:
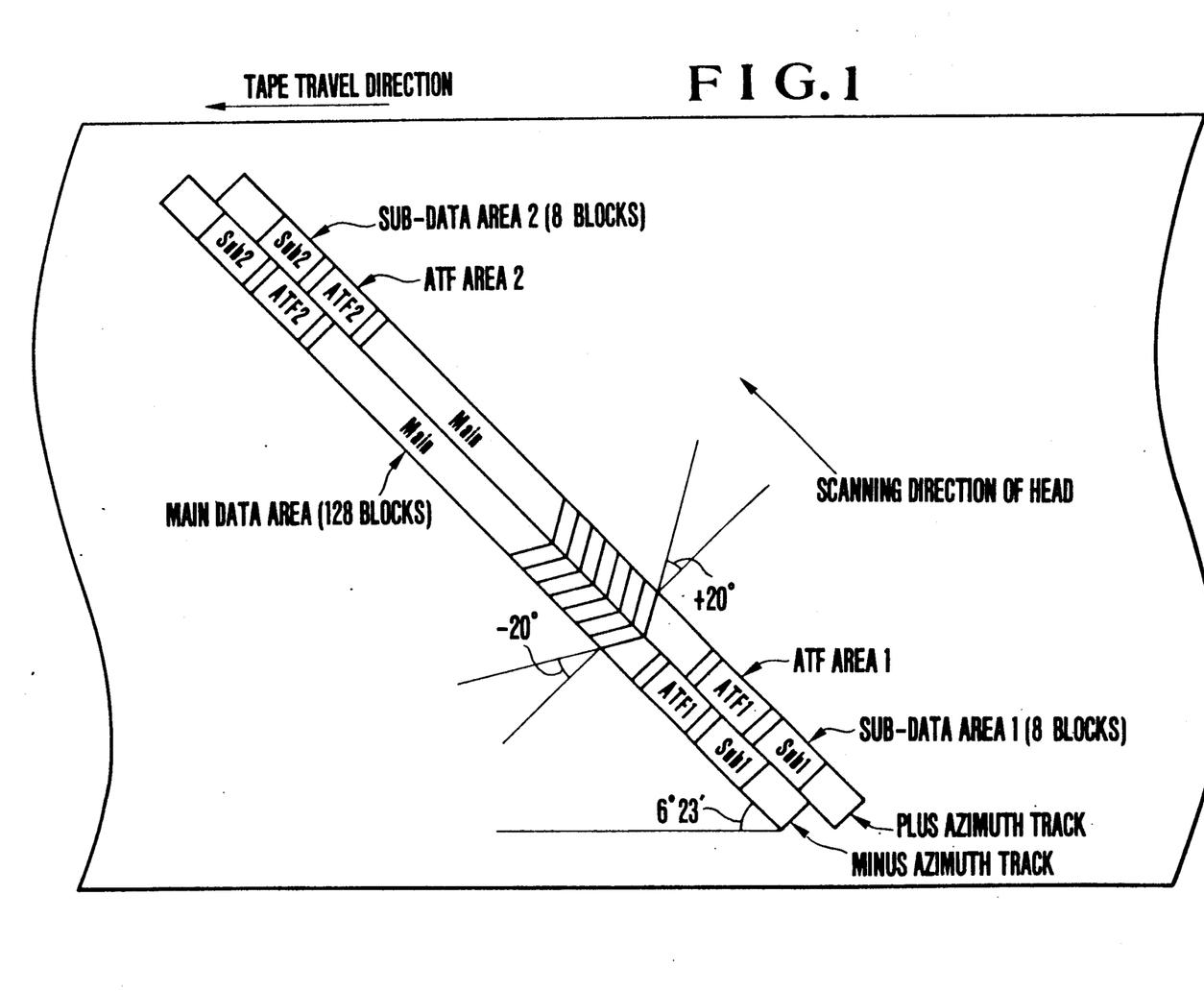
FIG. 1 shows a track format of the R-DAT.
Figure 2:
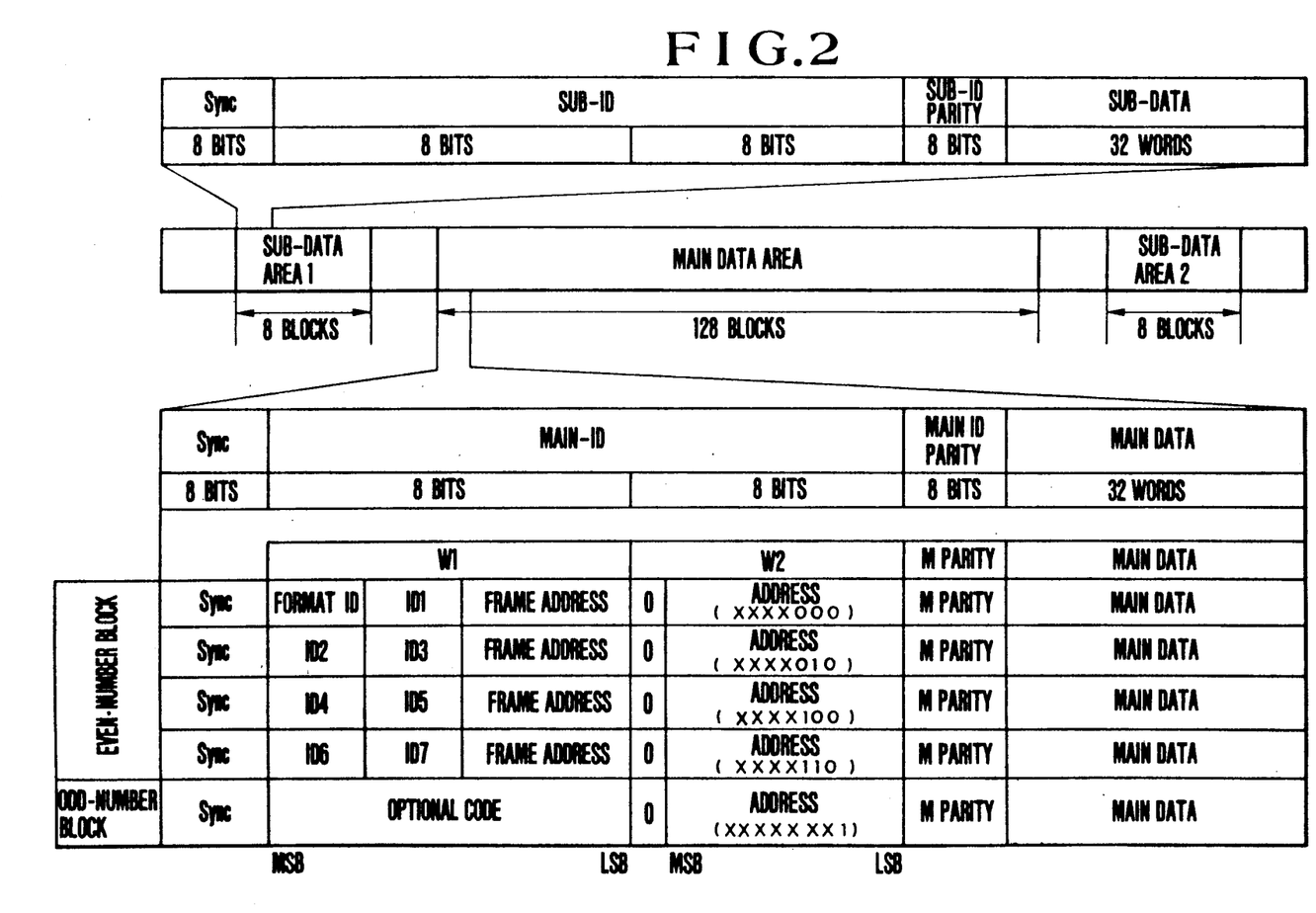
FIG. 2 shows a recording format for sub-codes shown in FIG. 1.

If the DAT is of a rotary head type (hereinafter referred to as R-DAT), it is conceivable to write the above-stated table-of-contents information in a sub-code area in a known manner. The details of the sub-code are as described, for example, in an article entitled "Sub-code Format and Use of It" appeared in the Nov., 1987 issue of "JAS Journal". FIGS. 1 and 2 of the accompanying drawings are excerpted from this article.

FIG. 1 shows the track format of the R-DAT and FIG. 2 a recording data format.

As shown in FIG. 1, in the case of the R-DAT, tracks of two different kinds, including minus azimuth tracks and plus azimuth tracks, are alternately recorded in the traveling direction of the tape. Each of these tracks, roughly speaking, consists of sub-data areas 1 and 2; ATF areas 1 and 2 in which pilot signals for automatic track finding (hereinafter referred to as ATF) are recorded for a tracking servo; and a main data area. The sub-data areas are provided for recording data to be used in making a high speed search for a music number, a time code, a program number, etc. These sub-data areas are arranged to permit the addition by after-recording of a table of contents of music items or other program number, etc. The main data area is provided for recording an audio signal which is pulse-code-modulated (hereinafter referred to as PCM).

The details of the sub-code recording format for the sub-data areas are as shown in FIG. 2. Each of the sub-data areas 1 and 2 consists of eight blocks. The sub-data areas thus include a total of 16 blocks. Each sub-data area includes a block synchronizing data area SYNC; a sub-ID area which is provided for an identification code; a sub-ID parity area which is provided for sub-ID parity; and a sub-data part which follows the sub-ID parity area is provided for allowing such data as a time code, date, etc., to be written therein.

A main ID code has an 8-block completing type format. Even-number blocks are provided mainly for identifying the properties (attributes) of PCM audio data, such as a sampling frequency, a channel number, the number of quantizing bits, a track pitch, etc. Odd-number blocks are provided for recording search codes, such as codes for a program number, a time code, etc.

Generally, the conventional recording and reproducing apparatus is arranged to write the table-of-contents information in the leader part of the magnetic tape. In reproducing the table-of-contents information or in making an addition to the table-of-contents information or in rewriting it, therefore, the magnetic tape must be rewound back to its leader position. This has presented a problem in terms of operability. While this presents no problem in cases where a magnetic disc is employed as the recording medium, this has necessitated much time and labor in the case of the magnetic tape.

SUMMARY OF THE INVENTION

It is a general object of this invention to solve the above-stated problem.

It is a more specific object of the invention to provide a recording and reproducing apparatus which is arranged to facilitate recording and reproduction of the above-stated table-of-contents information.

Under this object, a recording and reproducing apparatus which is arranged according to this invention comprises: main recording and reproducing means for recording and reproducing a main signal on and from a recording medium; auxiliary recording and reproducing means for recording and reproducing on and from the recording medium table-of-contents information which is to be used in making a search for the main signal; erasing means for erasing the table-of-contents information recorded on the recording medium; a memory for storing the table-of-contents information; loading detecting means for detecting that the apparatus is loaded with the recording medium; and control means arranged to cause the auxiliary recording and reproducing means to reproduce the table-of-contents information according to an output of the loading detecting means, to cause the reproduced table-of-contents information to be written in the memory and to cause the erasing means to erase from the recording medium the table-of-contents information reproduced by the auxiliary recording and reproducing means.

The above and other objects and features of this invention will become apparent from the following detailed description of an embodiment thereof taken in connection with the accompanying drawings.

DETAILED DESCRIPTION OF THE PREFERRED EMBODIMENT

Figure 3:
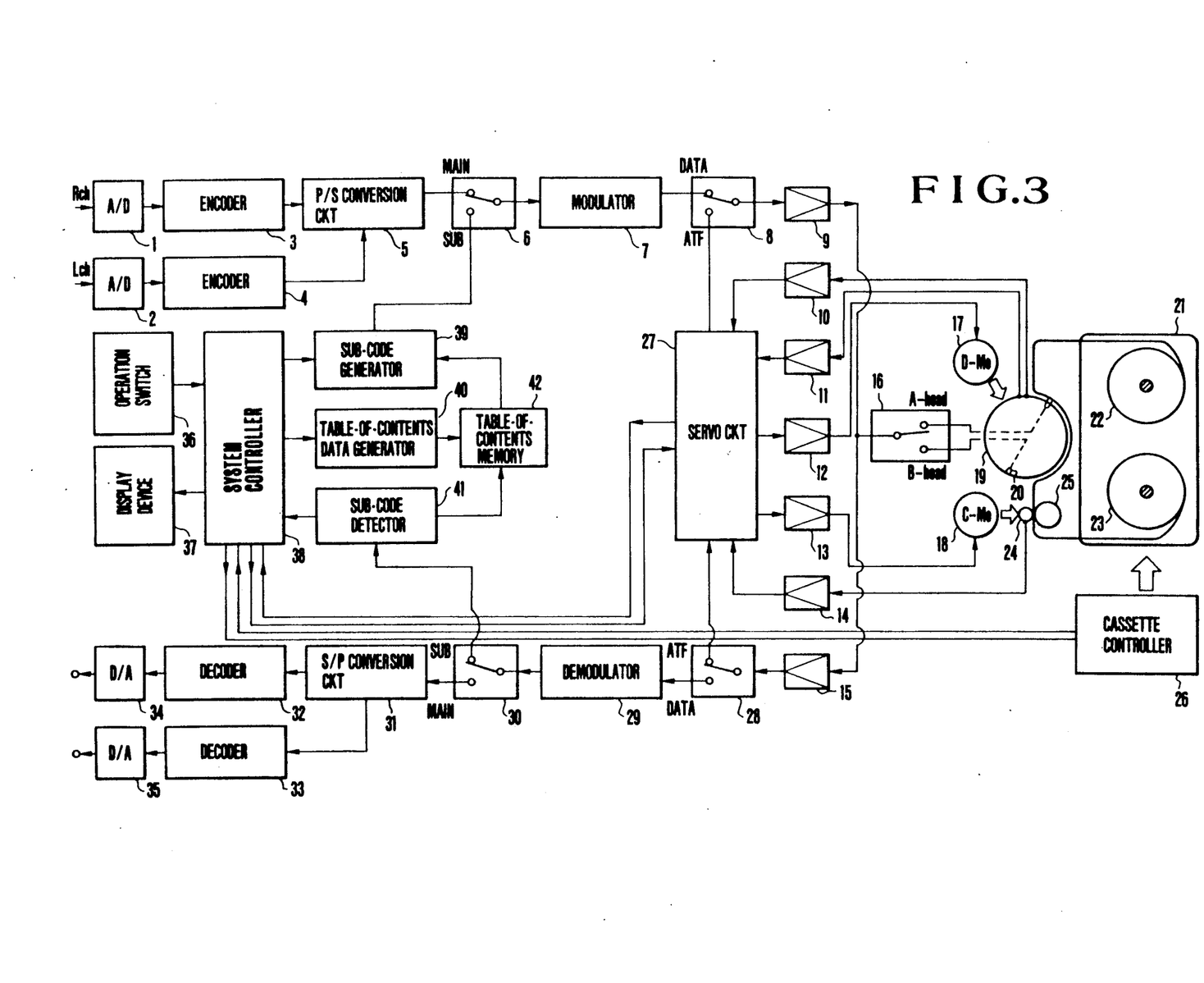
FIG. 3 is a block diagram showing the arrangement of a recording and reproducing apparatus which is arranged as an embodiment of this invention.

FIG. 3 is a block diagram showing an R-DAT arranged as a recording and reproducing apparatus embodying this invention.

Referring to FIG. 3, an analog-to-digital (hereinafter referred to A/D) converter 1 is arranged to convert the analog audio signal of a right channel Rch into a digital signal and to sample and quantize it. Another A/D converter 2 is arranged to convert the analog audio signal of a left channel Lch into a digital signal and to sample and quantize it. Encoders 3 and 4 are arranged to add parity bits which serve as error correction codes to the digital signals output from the A/D converters 1 and 2. A parallel-to-serial (hereinafter referred to as P/S) conversion circuit 5 is arranged to convert parallel signals output from the encoders 3 and 4 into a serial signal.

A change-over switch 6 is arranged to output main data MAIN output from the P/S conversion circuit 5 or sub-code data SUB output from a sub-code generator 39 by switching them from one over to the other at a given timing. A modulator 7 is arranged to modulate the signal output from the change-over switch 6. A change-over switch 8 is arranged to selectively output the data DATA output from the modulator 7 or a pilot signal ATF for automatic track finding by switching them from one over to the other. A recording amplifier 9 is arranged to amplify the signal output from the change-over switch 8. An amplifier 10 is arranged to detect the rotation phase of a rotary drum through a rectangular signal PG of 30 Hz which is synchronized with the rotation of the rotary drum.

An amplifier 11 is arranged to amplify the output of a drum FG which indicates the rotation speed of the rotary drum. A driving amplifier 12 is arranged to drive a rotary drum driving motor. A driving amplifier 13 is arranged to drive a capstan motor. An amplifier 14 amplifies a capstan FG and is arranged to indicate the rotation frequency of a capstan 24. An amplifier 15 is arranged to amplify a reproduced signal output from a head. A head change-over switch 16 is arranged to cause a switching action performed on a pair of rotary heads 20. A drum driving motor (D-Mo) 17 is arranged to be driven by the driving amplifier 12. A capstan motor (C-Mo) 18 is arranged to drive the capstan 24. An upper drum 19 arranged to be caused to rotate by the drum driving motor 17. The pair of rotary heads 20 are symmetrically mounted on the periphery of the upper drum 19.

A cassette 21 is provided with a supply reel 22 and a take-up reel 23 and is arranged to take up or rewind a magnetic tape between the supply reel 22 and the take-up reel 23. The capstan 24 is arranged to be rotated at a constant speed by the capstan motor 18. A pinch roller 25 is arranged to push the magnetic tape against the capstan 24. A cassette controller 26 is arranged to produce switching information required in loading, unloading and inserting the cassette 21.

A servo circuit 27 is arranged to control the motors on the basis of information on the above-stated drum FG, the capstan FG, the PG, etc., and an instruction from a system controller 38. A change-over switch 28 is arranged to supply the ATF pilot signal output from the amplifier 15 to the servo circuit 27 and also to supply data to a demodulator 29. The demodulator 29 is arranged to demodulate from the data the PCM audio signal and the sub-code. A change-over switch 30 is arranged to supply the sub-code SUB to a sub-code detector 41 and also to send the PCM audio signal MAIN to an S/P conversion circuit 31.

A serial-to-parallel conversion circuit 31 is arranged to convert the PCM audio signal output from the change-over switch 30 into a parallel signal from its serial state. A decoder 32 is arranged to perform an error correction process, etc., on the right channel audio signal by using the above-stated parity bit. Another decoder 33 is arranged to perform an error correction process, etc., on the left channel audio signal. A digital-to-analog (hereinafter referred to as D/A) converter 34 is arranged to convert a signal output from the decoder 32 into an analog signal. Another D/A converter 35 is arranged to convert a signal output from the decoder 33 into an analog signal.

An operation switch 36 is arranged to permit the operator to manually enter instructions and consists of STOP, PLAY (reproduction), REC (recording), REW (rewinding), EJECT (taking-out) and FF (fast forward) switches, a ten-key pad, etc. A display device 37 is connected to the system controller 38 and is arranged to display an operation mode, a tape count value, a program number, etc. The system controller 38 is arranged to control the whole apparatus. A sub-code generator 39 is arranged to generate a sub-code. A table-of-contents data generator 40 is arranged to generate table-of-contents data. A sub-code detector 41 is arranged to detect a sub-code existing within the sub-code area from sub-code (SUB) information output from the change-over switch 30. A table-of-contents memory 42 is arranged to store the table-of-contents data from the table-of-contents data generator 40 and to send the table-of-contents data as necessary to the sub-code generator 39 for recording the table-of-contents data on the magnetic tape.

The embodiment which is arranged as described above operates as described below:

Normal recording and reproducing operations are first described. For normal recording or reproduction, the drum driving motor 17 is caused to rotate by a drum driving signal output from the driving amplifier 12. This causes the upper drum 19 to rotate at a constant speed. The magnetic tape which is pulled out from the cassette 21 is transported at a low speed by the capstan 24 which is driven by the capstan motor 18.

In recording, the audio signals of the right and left channels which are supplied to the A/D converters 1 and 2 are respectively sampled and quantized. After that, the audio signals are supplied to the encoders 3 and 4 to have error correcting parity words added to them. The outputs of the encoders 3 and 4 are supplied to the P/S conversion circuit 5 to be time serially converted from parallel signals into a serial signal. A PCM signal thus obtained is sent via one side MAIN of the change-over switch 6 to the modulator 7 at a timing when the head 20 traces the main data area which is as shown in FIG. 1. Meanwhile, sub-code data output from the sub-code generator 39 is sent via another side SUB of the change-over switch 6 to the modulator 7 at a timing when the head 20 traces the sub-data areas 1 and 2 which are as shown in FIGS. 1 and 2. The PCM audio signal and the sub-code data modulated by the modulator 7 and the ATF pilot signal output from the servo circuit 27 are selected by the change-over switch 8 in such a way as to be recorded in accordance with the track format shown in FIG. 1. The signal thus selected is amplified by the amplifier 9. The amplified signal is supplied via the head change-over switch 16 to the head 20. The head 20 records the signals thus supplied one after another on the magnetic tape which is wound around the drum.

In reproducing, the PCM audio signal, the sub-code data and the ATF pilot signal recorded on the magnetic tape are read out alternately by the pair of heads 20 through the head change-over switch 16. The signals thus read out are amplified by the amplifier 15 and, after that, are supplied to the change-over switch 28. The switch 28 supplies the ATF pilot signal to the servo circuit 27 only when the ATF pilot signal is received and supplies other signals (or data) to the demodulator 29. The demodulator 29 separates the PCM audio signal and the sub-code from each other. Then, they are supplied to the change-over switch 30 to be distributed to the S/P (serial-to-parallel) conversion circuit 31 and the sub-code detector 41 respectively. The PCM audio signal is converted by the S/P conversion circuit 31 from the state of a serial signal into parallel signals for the right and left channels which are supplied to the decoders 32 and 33. The decoder 32 then performs a code conversion process on the right channel signal while the decoder 33 performs a code conversion process on the left channel signal. The right and left channel signals thus decoded by the decoders 32 and 33 are supplied to the D/A converters 34 and 35 to be converted back into analog signals.

The table-of-contents data is processed in the following manner: When the EJECT switch is turned on at the operation switch part 36, the table-of-contents data stored in the table-of-contents memory 42 is edited into a sub-code by the sub-code generator 39. The sub-code is supplied via the amplifier 9 and the head change-over switch 16 to the head 20 to be recorded by the head in the sub-data area on the magnetic tape. Further, when the cassette 21 is inserted in the apparatus, the cassette controller 26 detects that the cassette 21 is set in position. Then, in association with this, a tape loading movable pin which is not shown moves to form a tape path.

Figure 4:
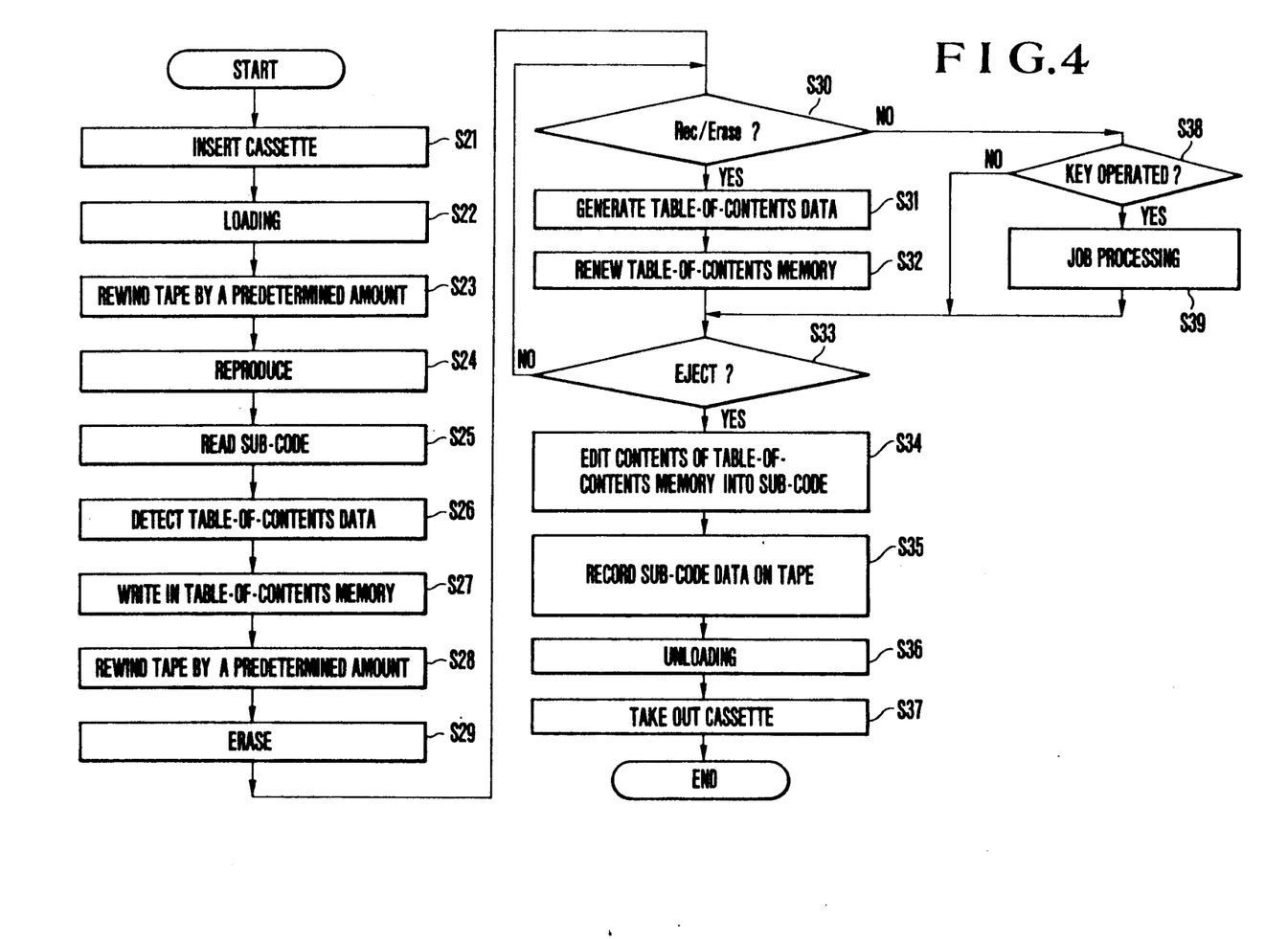
FIG. 4 is a flow chart showing the reproducing and recording operation performed on table-of-contents information by the apparatus of FIG. 3.

Referring to FIG. 4 which is a flow chart, the processes of writing table-of-contents data into the table-of-contents memory 42, erasing table-of-contents data recorded on the magnetic tape and recording table-of-contents data on the tape are as described in detail below:

At a step S21: The cassette 21 is inserted into the apparatus. At a step S22: The loading mechanism acts to pull out the magnetic tape from the cassette 21 and to wind the tape around the drum as described in the foregoing. At a step S23: The tape is rewound by a predetermined amount by means of the capstan 24. At a step S24: A reproduction mode is obtained. At a step S25: The sub-code within the sub-data area is read by the sub-code detector 41. At a step S26: The table-of-contents data is detected. At a step S27: The contents of the table-of-contents data are written into the table-of-contents memory 42. At the same time, the contents of the table-of-contents data are displayed by the display device 37. At a step S28: The magnetic tape is rewound again by a predetermined amount by means of the capstan 24. At a step S29: Either a flag indicating that the table-of-contents data is invalid is set or the sub-code data which does not include the table-of-contents data is edited, and the table-of-contents data is erased by writing the sub-code data over the table-of-contents data written in the table-of-contents memory 42 with the apparatus set in its recording mode.

At a step S30: After the table-of-contents data is written into the table-of-contents memory 42, the operation switch 36 is monitored for an operation on the "REC/ERASE" switch thereof. If the REC/ERASE switch is found to have been operated, the flow comes to a next step S31 on the assumption that the contents of the record have been changed. At the step S31: The table-of-contents data generator 40 is caused to generate new table-of-contents data. At a step S32: An applicable part of the contents of the table-of-contents memory 42 is rewritten. Meanwhile, if the REC/ERASE switch is found not to have been operated, the flow comes to a step S38. At the step S38: If, among the switches of the operation switch 36, some switch that brings about no change in the contents of the record is operated, the flow comes to a step S39 to execute a process corresponding to the function of this switch. At a step S33: The EJECT switch is checked to see if it is operated. If the EJECT switch is found to be not operated, the flow comes back to the step S30. If the EJECT SWITCH is found to be operated, the flow comes to a step S34. At the step S34: The contents of the table-of-contents memory 42 are edited into a sub-code by the sub-code generator 39. At a step S35: The sub-code data thus obtained is recorded on the tape. At a step S36: When the cassette 21 is unloaded, the flow comes to a step S37 to have the cassette 21 taken out.

As described above, the contents of the table-of-contents memory 42 are edited into the sub-code and is recorded on the magnetic tape as sub-code data immediately before the cassette 21 is taken out. With the sub-code data thus written on the tape, when the tape cassette 21 is inserted into the apparatus, the sub-code is read out from the magnetic tape in accordance with the process described in the foregoing. Then, the table-of-contents data is detected from the sub-code. The table-of-contents data thus detected is written into the table-of-contents memory 42. Upon completion of writing, the sub-code written on the magnetic tape is erased. In accordance with the above-stated arrangement of this embodiment, information on the table of contents can be read out at the point of time when the cassette is inserted. Unlike the conventional arrangement, the arrangement of this embodiment does not necessitate information on the table of contents to be written in the leader part of the magnetic tape. It thus obviates the necessity of rewinding the magnetic tape every time the record is edited.

Further, if the cassette is loaded on an apparatus having no function of rewriting the table-of-contents data and the tape position is shifted, the table-of-contents data remaining on the tape always gives the latest data. Therefore, no confusion will be caused by reproduction of old table-of-contents data.

Figures 5A, 5B, 5C:
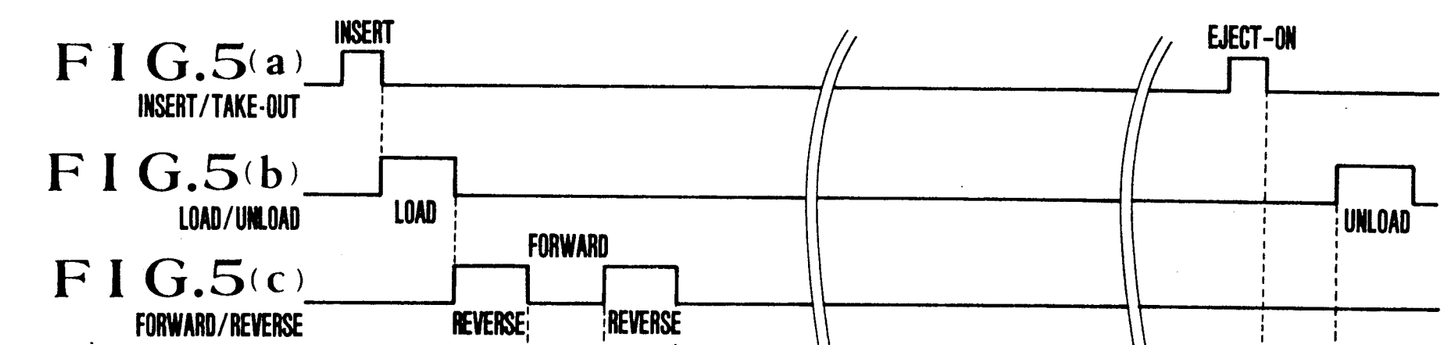
FIGS. 5(a) to 5(g) show in a time chart the operation of the apparatus of FIG. 3.
Figures 5D, 5E, 5F, 5G:
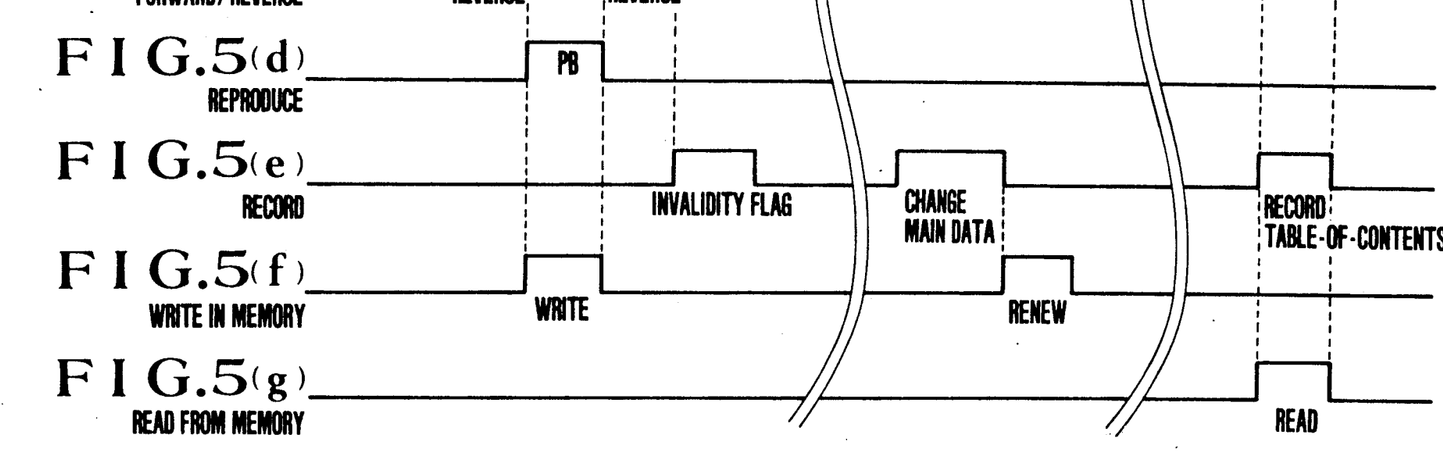

FIGS. 5(a) to 5(g) show in a timing chart the operation of this embodiment of the invention. The cassette 21 is inserted at the timing shown in FIG. 5(a). Then, a loading action is performed on the cassette 21 at the timing of FIG. 5(b) in synchronism with completion of the process of insertion. Upon completion of leading, the supply reel 22 is rotated in the reverse direction by a predetermined amount at the timing of FIG. 5(c). At the timing of FIG. 5(d), the supply reel 22 is set to be rotatable in the forward direction and, at the same time, the apparatus comes to take a reproducing and memory-writing mode. Then, as shown in FIG. 5(f), the table-of-contents data included in the sub-code recorded on the magnetic tape is written into the table-of-contents memory 42. Upon completion of writing, the magnetic tape is again rewound as shown in FIG. 5(c). Upon completion of the rewinding action, the apparatus instantly comes to take its recording mode as shown in FIG. 5(e). An invalidity flag is written in the sub-code area and the table-of-contents data is erased.

In a case where a change has occurred in the main data as shown in FIGS. 5(e) and 5(f), as in the case of a recording mode, an erasing mode or the like, the contents of the sub-code are rewritten. Further, if the EJECT switch is operated at the timing as shown in FIG. 5(a), the contents of the table-of-contents memory 42 are read out at the timing of FIGS. 5(e) and 5(g) and are edited into a sub-code. The edited sub-code is written on the magnetic tape. After that, the magnetic tape is unloaded at the timing as shown in FIG. 5(b).

Figure 6:
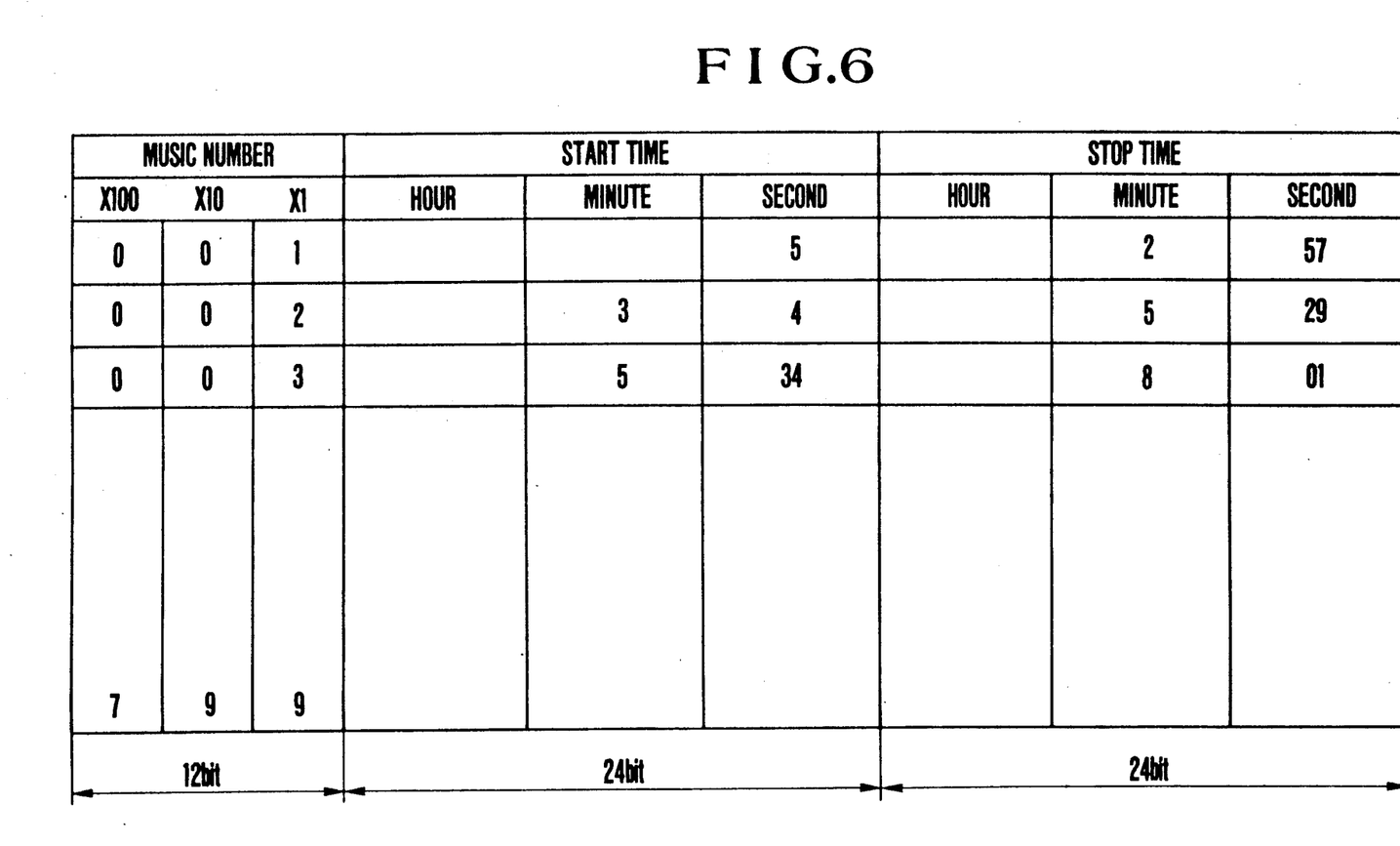
FIG. 6 shows data allocation within a memory of the apparatus of FIG. 3.

FIG. 6 is a memory chart showing the data allocation of the table-of-contents memory 42.

In recording music, a music number is entered by means of the operation switch 36. The table-of-contents data generator 40 then generates, as table-of-contents information (or data), the music number thus entered and its absolute address on the tape (time: start time and stop time). The table-of-contents data is thus stored in the table-of-contents memory 42.

The table-of-contents memory 42 thus stores the start time and the stop time of the music. Therefore, a performance time point between the start and the stop and the whole length of performance time can be displayed by the display device 37.

Further, as apparent from the foregoing description, the system controller 38 prepares a sub-code format by means of the sub-code generator 39. The table-of-contents data is included in this format. The main data and the sub-code data are written on the magnetic tape in a time sharing manner. When an instruction for a desired music number is supplied via the operation switch 36, the system controller 38 acts to read out from the table-of-contents memory 42 the music number and an applicable absolute address on the tape on the basis of the list of music numbers and the absolute addresses (start time) stored at the table-of-contents memory 42 and to control the capstan 24 to make a search for the start position of the desired music.

While the invention is applied to an R-DAT (rotary head type digital audio tape recorder) in the case of the embodiment described, the applications of the invention are not limited to the apparatus of this kind. The invention is applicable, for example, also to the so-called 8-mm format VTR or the like, wherein ID words are prepared and included in PCM data in such a way as to permit a leader-part look-up operation.

Further, as apparent from FIG. 2, the table-of-contents data TOC (data indicating the addresses of music numbers) which is essential to this invention can be recorded within both the main ID and sub-data areas. In cases where the data TOC is recorded in both the areas, the data recorded in the sub-data area have priority over the data recorded in the main ID area. After-recording in the sub-data area is performed by overwriting into a recorded track.

While the details of this invention have been described through a preferred embodiment thereof, the invention is not limited to the embodiment. It goes without saying that changes and variations may be made without departing from the spirit or scope of the invention.

The arrangement of the embodiment described in the foregoing gives the following advantages: The table-of-contents information can be read out without any redundant steps of operation. The table-of-contents information will never be differently and variously recorded on one and the same recording medium. No confusion, therefore, results from the information.

Further, since both the writing and reading actions on the table-of-contents information can be automatically accomplished, the use of a tape permits a search for the table of contents to be accomplished with the same degree of efficiency as in cases where a disc is employed as the recording medium.

What is claimed is:

1. A recording and reproducing apparatus comprising:
   a) main recording and reproducing means for recording and reproducing a main signal on and from a recording medium;
   b) auxiliary recording and reproducing means for recording and reproducing, on and from said recording medium, table-of-contents information which is to be used in making a search for said main signal;
   c) erasing means for erasing said table-of-contents information recorded on said recording medium;
   d) a memory for storing said table-of-contents information;
   e) loading detecting means for detecting that the apparatus is loaded with said recording medium; and
   f) control means arranged to cause said auxiliary recording and reproducing means to reproduce said table-of-contents information according to an output of said loading detecting means, to cause said reproduced table-of-contents information to be written in said memory and to cause said erasing means to erase, from said recording medium, said table-of-contents information reproduced by said auxiliary recording and reproducing means.

2. An apparatus according to claim 1, wherein said recording medium is a tape-shaped recording medium, said apparatus further comprising transport means arranged to transport said tape-shaped recording medium in the longitudinal direction thereof.

3. An apparatus according to claim 2, wherein said control means is arranged to cause said transport means to rewind said tape-shaped recording medium by a predetermined amount according to an output of said loading detecting means and, after that, to cause said auxiliary recording and reproducing means to reproduce said table-of-contents information.

4. An apparatus according to claim 1, further comprising eject instructing means which gives an instruction for ejecting said recording medium from the apparatus, and wherein said control means is arranged to read out said table-of-contents information stored in said memory in response to an output of said eject instructing means and to cause said auxiliary recording and reproducing means to record on said recording medium said table-of-contents information read out from said memory.

5. An apparatus according to claim 4, further comprising ejecting means for ejecting said recording medium in response to the instruction of said eject instructing means after said table-of-contents information is recorded by said auxiliary recording and reproducing means.

6. An apparatus according to claim 4, wherein said recording medium is a tape-shaped recording medium, said apparatus further comprising transport means for transporting said tape-shaped recording medium in the longitudinal direction thereof.

7. An apparatus according to claim 6, wherein said control means is arranged to cause said transport means to rewind said tape-shaped recording medium by a predetermined amount according to an output of said loading detecting means and, after that, to cause said auxiliary recording and reproducing means to record said table-of-contents information.

8. An apparatus according to claim 1, further comprising rewriting means for rewriting said table-of-contents information recorded in said memory according to the main signal recording action of said main recording and reproducing means.

9. A recording and reproducing apparatus comprising:
 (a) main recording and reproducing means for recording and reproducing a main signal on and from a recording medium;
 (b) auxiliary recording and reproducing means for recording and reproducing, on and from said recording medium, table-of-contents information which is to be used in making a search for said main signal;
 (c) erasing means for earsing said table-of-contents information recorded on said recording medium;
 (d) a memory for storing said table-of-contents information; and
 (e) control means arranged to cause said earsing means to erase, from said recording medium, reproduced table-of-contents information according to writing said table-of-contents information reproduced by said auxiliary recording and reproducing means into said memory.

* * * * *